(No Model.)

C. E. CANFIELD.
CAR TRUCK.

No. 562,884. Patented June 30, 1896.

WITNESSES:
Wm. C. Farnum
Chas Canfield

INVENTOR:
C. Ernest Canfield.

UNITED STATES PATENT OFFICE.

CHARLES ERNEST CANFIELD, OF PHILADELPHIA, PENNSYLVANIA.

CAR-TRUCK.

SPECIFICATION forming part of Letters Patent No. 562,884, dated June 30, 1896.

Application filed August 5, 1895. Serial No. 558,310. (No model.)

*To all whom it may concern:*

Be it known that I, CHARLES ERNEST CANFIELD, a citizen of the United States, residing at Philadelphia, in the State of Pennsylvania, have invented certain new and useful Improvements in Motor-Trucks for Railway-Cars, of which the following is a specification.

The object of my invention is to provide a pivotal motor-truck under each end of a railway-car, consisting of a large pair of driving-wheels carrying practically the whole load, a pair of smaller guiding-wheels, and a truck-frame of such construction as to permit a relative vertical movement between the truck and car-body, and prevent the lightly-loaded guide-wheels from being lifted from the track, either by the torque of the motor or their own momentum when passing over obstructions.

Figure 1:
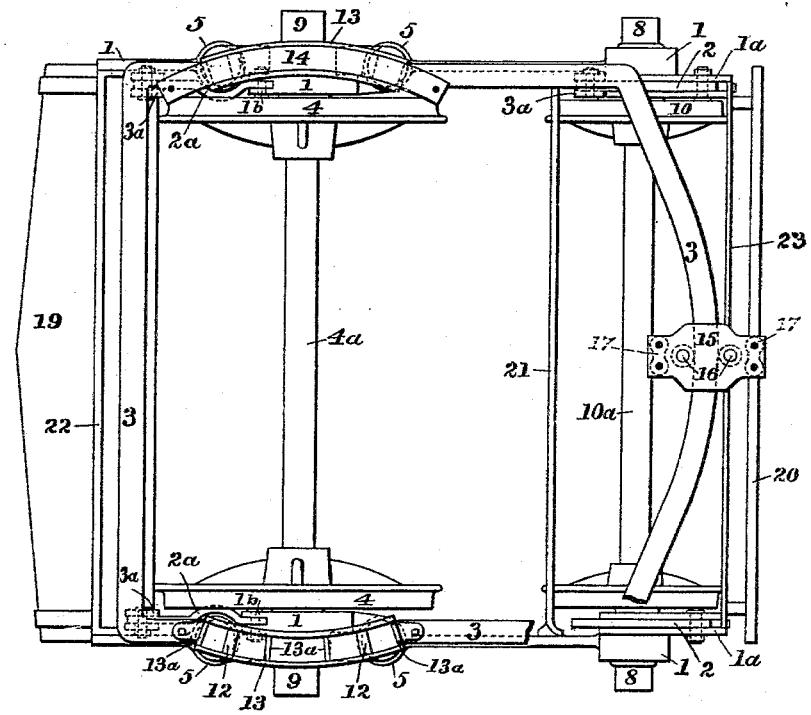
Figure 2:
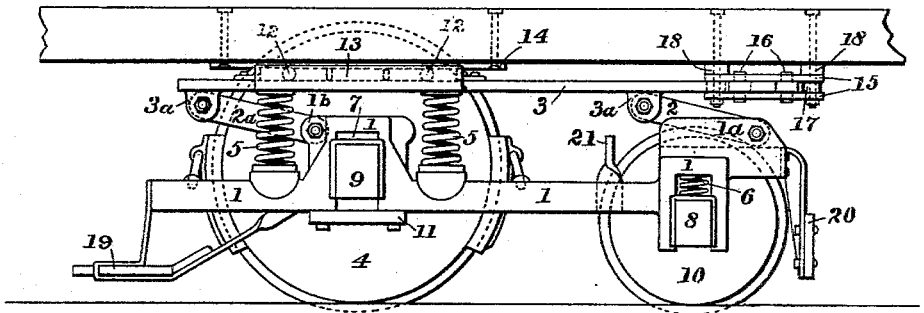

Of the accompanying sheet of drawings, which fully illustrate my invention, Figure 1 is a plan view of the complete truck, and Fig. 2 a side elevation of the same.

The truck is of the four-wheel radial type and has one pair of its wheels of the usual large diameter for driving and the other pair of a less diameter, so as to swing under the sill of the car when passing around curves.

The large pair of wheels 4 are located under the outer end of the truck, on the axle 4ª, the ends of which run in suitable journal-boxes 9.

A yoke or wheel-piece 1 extends along each side of the truck and has vertical jaws or guides formed therein for the reception of the journal-boxes 9 and also the boxes 8 of the small guiding-wheels. Over the box 9, between it and the yoke 1, is a rubber cushion 7, and underneath the box across the bottom ends of its guides is a detachable brace 11. On each side of the journal-box 9, upon the yoke 1, is a seat for the reception of the coiled springs 5, which springs support the top frame of the truck 3, and through it the car-body. This top frame 3 is of the form shown, being quadrilateral, with three curved segments or arcs described about the pivotal center of the truck, which center is located over the center of the driving-axle 4ª. Two of these arcs are located upon opposite sides of the frame over the journal-boxes 9 and form tracks for four antifriction-rollers 12. A plate 14, curved to the same radius as the roller-track on the top frame, is bolted underneath the car-sills on each side and forms the upper track on which through the rollers 12 the car-body is supported. The rollers are in the form of the frustum of a cone, the vertex of which is the radial center of the truck, and the tracks, both upon the truck and car-body, are beveled to run upon this shape. A guide-casting 13, consisting of two upright bands or circular segments connected by ribs 13ª, is bolted through horizontal ears at each end to the top frame 3 and forms a guide for the rollers 12 as well as the body-plate 14, which fits between the two upright segments, thus preventing any relative horizontal movement between the car-body and truck except in the path of the rollers 12, which is a circular arc about the radial center of the truck.

The body-plate 14 is left off of one side in Fig. 1 of the drawings, showing the side bearing and rollers in full. One corner of the top frame 3 is also broken away to show the form of the wheel-piece underneath. The inner end of the top frame 3 forms the third of these three arcs, which is described about the same center, although of a greater radius than the two on the sides. This curved part of the top frame is embraced by a guide consisting of top and bottom plates 15, having separators 17 between, and carrying the two perpendicular rolls 16, the whole being secured to the bottom of the car-body by bolts passing through the plates 15, separators 17, and filling-blocks 18, and thence into the car-timbers. The rolls 16 are intended to travel on the edges of the curved frame and to receive the endwise strain between the car-body and truck incident to starting and stopping. As comparatively little weight is carried by this end of the frame, no horizontal rollers are provided as in the side bearings. Between the journal-box 8 of the small guiding-wheel axle and the wheel-piece 1 is a light coiled spring 6, which will be hereinafter alluded to.

The top frame 3 has on each side two downwardly-projecting jaws or ears 3ª, in which are hinged the upper ends of two parallel connecting-links 2 and 2ª. These links are of equal length from center to center, and are hinged at their lower ends to the wheel-pieces 1 in the jaws 1ª and 1ᵇ. The jaws 1ª are made long to embrace the links 2 for nearly their whole length, thus forming guides to steady the links and through them the top frame 3. The links 2ª are bent so as to clear the coiled springs 5.

On the outer end of the truck is a wooden life-guard 19, supported from the frame by iron straps, and a smaller wheel-guard 20 is attached to the inner end ahead of the small guide-wheels. A motor-supporting bar 21 extends across the truck from side to side, being secured at the ends to the wheel-pieces 1. In Fig. 2 brake-shoes are shown supported on the wheel-pieces and applied to each side of the driving-wheels, but these do not form any part of this invention. Two transverse end bars 21 and 22 unite the ends of the wheel-pieces 1.

As at present constructed, pivotal trucks carrying most of the load on the driving-axle and allowing the guiding-wheels to run practically unloaded manifest in practice a dangerous tendency to leave the track for two reasons. The first reason is: The guide-wheels when striking any considerable obstruction are suddenly thrown upward and being unloaded and offering little resistance, they frequently, through the momentum thus gained, jump high enough for their flanges to clear the rail and leave the track, thus derailing the truck. The second reason is: The motor in driving upon the axle of the large wheels exerts by its turning movement about the driving-axle either an upward or downward force, according to the direction of driving, at its point of support outside the driving-axle. The outer motor-support being upon the wheel-pieces near the guiding-wheel axle, this force when exerted upward acts to lift the guide-wheels, with the same result as in the first case. In both cases the guide-wheel end only of the wheel-piece is lifted, the driving-wheel end being held down by the load of the car-body. Thus the wheel-piece is tilted, or one end is lifted more than the other. It is possible to remedy this tilting tendency by distributing the weight and placing a larger part of it upon springs nearer the guiding-wheels, but this lessens the traction of the driving-wheels, and, moreover, the wheel-piece frame having independent resilient connections at each end with the car-body, there may still be a greater lifting of the wheel-piece frame at one end than at the other. Therefore the frame of the truck herein described is so constructed as to allow the wheel-piece member to rise and fall with the driving-wheels, when passing over obstructions, and at the same time, through the parallel swinging link connections between the car-body member or top plate and the wheel-piece member, to keep this movement equal in amount throughout the entire length of the wheel-piece. Thus any two lines of the top frame and wheel-piece, respectively, which are parallel at one relative position of the parts are held parallel at all positions.

The action of the different parts of this truck will be readily understood from the construction shown in the drawings, and is as follows: The large coiled springs 5 are made heavy enough to support, with a proper deflection, the entire weight of the car-body and its load. For clearness of explanation we may consider the truck as it would stand with the small wheels 10 removed entirely. In this case we would have the driving-wheels carrying the load, with the motor supported jointly by the axles 4ª and the bar 21 on the truck-frame. The weight of the motor on the bar 21 tends to depress the inner ends of the wheel-pieces, but this downward force must be expended in the direction of the swing of the links 2 as the wheel-pieces cannot move vertically except in the paths of their parallel connecting-links. Therefore the downward force exerted at this end of the frame will be transmitted from the links 2 through the wheel-pieces 1 to the links 2ª and thus bring this part of the weight of the motor wholly on the journal 9 of the axle 4ª. The car-body is supported equally, independent of the link connections, on each side of the journal-boxes 9 on the springs 5. This combination would make a complete truck for a straight track and the truck-frame would rise and fall as obstructions were passed over, the wheel-pieces remaining constantly parallel to the car-body by reason of their parallel link connections therewith. Now, for guiding this truck around curves, we insert the journals of a pair of idle-wheels in the open jaws on the inner ends of the wheel-pieces. The light spring 6, graduated to carry about ten per cent. of the load, is placed over the journal-boxes 8 of the guiding-wheels. The office of this spring is not to help carry the load, although incidentally it does so, but to exert a slight downward pressure upon the guide-wheels. This pressure is constant, as the wheel-pieces are held constantly parallel with the track, as well as with the car-body, and their distance from the track remains constant, being governed by the height of the driving-axle. The springs 6 should have their total movement before closing up slightly less than the depth of the flange on the guide-wheels 10. Thus a sudden upward thrust of the guide-wheels will be checked before the flanges are clear of the track, and in case the upward thrust is caused by an obstruction of considerable height the further upward motion of the wheels will raise the wheel-pieces parallel with the car-body, thereby compressing the main springs 5. Normally, however, the guide-wheels will play up and down in the wheel-pieces independently of the action of the truck-frame and serve only to guide the truck-frame around curves.

When the driving-wheels pass over obstructions, they lift the wheel-pieces independently of the small wheels and raise the car-body through the main spring 5. In this case the wheel-pieces will be lifted slightly from the journal-boxes 8 of the guide-wheels, but this is compensated for by the expansion of the springs 6. The relative vertical movement of the truck and body will produce, through the swing of the links 2 and 2ª, a slight relative horizontal movement, but at the angle at which the links are placed this will be so slight as to be unnoticeable. The action of the roller side and end bearings is obvious from the drawings and preceding mention of the same.

I am aware that compound levers have been employed beneath the wheel-pieces of a car-truck for equalizing purposes, but the link connections hereinbefore described do not act as levers, nor is the action of one transmitted to the other except through the connecting medium of the interposed springs, wheel-piece, and pedestal.

I therefore claim as my invention and desire to secure by Letters Patent the following:

1. The combination in a radial car-truck of a pair of load-carrying wheels, longitudinal wheel-pieces mounted upon the axle of said wheels, a top frame supporting the car-body, springs and parallel link connections between said wheel-pieces and top frame, and a pair of guiding-wheels held in the ends of said wheel-pieces, substantially as described and for the purposes set forth.

2. In a motor-truck the combination of the wheel-piece 1, mounted on the driving-wheels 4, the top frame 3, the springs 5 and parallel link connections 2 and 2ª between the wheel-piece and top frame, and the guide-wheels 10, substantially as set forth.

3. The combination in a car-truck of wheel-pieces mounted at one end on a driving-axle and carrying at the other end two guiding-wheels, springs mounted on the wheel-pieces, a top frame supported on said springs, parallel link connections between the wheel-pieces and top frame, radial side bearings on the top frame supporting the car-body and an end connection of the top frame with the car-body, substantially as described.

4. The combination in a car-truck of wheel-pieces mounted at one end on a driving-axle and carrying at the other end two guiding-wheels, springs mounted upon the wheel-pieces, a top frame supported on said springs, and connections comprising parallel links between the wheel-pieces and top frame, substantially as described and for the purposes set forth.

5. The combination in a radial motor-truck of the top frame 3 having one end curved about the radial center of the truck, the two guide-plates 15 embracing said curved end, the perpendicular rollers 16 pivoted in the plates 15 and bearing against both edges of the curved end, the separator-blocks 17 and the filling-blocks 18, together with the bolts for securing the whole to the car-body, substantially as described.

6. The combination in a radial car-truck of the top frame 3 having curved segments on each side and one end, the guide-castings 13 secured on each side, the rollers 12, the curved plate 14 secured to the car-body and riding on said rollers, the guide-plate 15 located above and below the curved end segment, the vertical rollers 16 bearing on the edge of said end segment, and the separator-blocks 17, together with the bolts for securing the whole combination to the car-body, substantially as described.

7. The combination in a radial car-truck of a lower frame consisting of the wheel-pieces 1, connected at their ends by the bars 22 and 23, and across their center by the motor-support 21, a top frame 3 having radial, tractive connections with the car-body, springs interposed between said lower and top frames, and parallel link connections between the two frames allowing them to approach each other but keeping them in a relatively-parallel position, substantially as described and set forth.

8. The combination of the top frame 3 having the ears 3ª, the connecting-links 2 and 2ª, the wheel-piece 1, the jaws 1ᵇ and the elongated jaws 1ª substantially as described.

9. The combination with the journal-boxes of the driving and guiding wheels, of the wheel-piece 1, the rubber cushions 7, the springs 6, the parallel links 2 and 2ª and the top frame 3, substantially as described.

10. The combination in a car-truck of the top frame 3, the connecting-links 2 and 2ª, and the wheel-pieces 1, substantially as described and for the purposes set forth.

11. The combination in a car-truck of a lower frame resting upon the journal-boxes, a top frame supporting the car-body, and a plurality of connections comprising parallel links between the two frames, substantially as described and for the purposes set forth.

12. A radial car-truck having a wheel-piece on each side resting on a pair of driving-wheels and carrying at one end a pair of guiding-wheels, springs resting on said wheel-pieces and supporting a top frame, and a plurality of parallel links on each side, hinged at their lower ends to the wheel-pieces and at their upper ends to the top frame, all combined and adapted to operate substantially in the manner set forth.

In witness whereof I have hereto subscribed my name this 2d day of August, A. D. 1895.

C. ERNEST CANFIELD.

In presence of—
WM. C. FARNUM,
CHAS. CANFIELD.